Patented May 4, 1943

2,318,033

UNITED STATES PATENT OFFICE 2,318,033

PRODUCTION OF ALCOHOLS

Gerald H. van de Griendt, San Francisco, Kenneth E. Marple, Oakland, and Leslie M. Peters, San Francisco, Calif., assignors to Shell Development Company, San Francisco, Calif., a corporation of Delaware No Drawing. Application July 22, 1939, Serial No. 285,960

15 Claims. (Cl. 260—617)

This invention relates to a process for the production of monohydric alcohols of aliphatic or cycloaliphatic character by effecting the hydrolysis of the corresponding halogenated hydrocarbons.

The invention provides a practical, economical and commercially applicable process for effecting the hydrolysis of halogenated hydrocarbons which contain a single hydrolyzable halogen atom, and wherein said halogen atom is linked directly to a saturated carbon atom of aliphatic character, to the corresponding monohydric alcohols. The invention is of commercial value as applied to the conversion of unsaturated halogenated hydrocarbons which possess a single hydrolyzable halogen atom linked to a saturated carbon atom to the corresponding unsaturated monohydric alcohols; it is of particular value as applied to the production of unsaturated monohydric alcohols of the allyl type such as allyl alcohol, by effecting the hydrolysis of the corresponding allyl type halides, such as allyl chloride, allyl bromide, methallyl chloride, etc.

Many methods and reagents have been described for producing alcohols from hydrolyzable hydrocarbon halides, but these have certain disadvantages which make them not particularly suitable for large scale commercial production of the alcohols. For example, the hydrolysis of a halogenated hydrocarbon with a metal hydroxide, especially an alkali metal hydroxide, always gives an ether as a by-product in amounts so large that the disposal of this comparatively useless material would present a serious difficulty if the processes were practised on a large scale. The use of strong alkalis also converts a part of the halogenated hydrocarbon into an unsaturated derivative with a resultant lowering of the yield from this cause. Furthermore, the use of metal carbonates or bicarbonates which have been proposed for effecting the hydrolysis of halogenated hydrocarbons, while giving a smaller proportion of halogenated hydrocarbon converted into an ether than when a metal hydroxide is employed, leads to the necessity of providing heavy and strong reaction vessels to withstand the pressures developed by carbon dioxide gas liberated in the reaction. The present invention provides a commercially applicable method in accordance with which alkali metal hydroxides may be used without the adverse effects encountered with methods previously employed.

We have found that a high yield of monohydric alcohol may be obtained by reacting a halogenated hydrocarbon containing a single hydrolyzable halogen atom with an aqueous metal hydroxide solution in the presence of a salt of a strong base and a weak acid while maintaining the alkalinity of the reaction mixture within desired limits by regulating the rate of introduction of the metal hydroxide into the reaction mixture. The preferred range within which it is desirable to maintain the alkalinity of the reaction mixture is conveniently termed the "carbonate-bicarbonate" range. The most alkaline limit of this range is substantially equivalent to the alkalinity which would be produced, regardless of the particular hydroxide and the particular salt of a strong base and a weak acid used, if the reaction mixture contained, disregarding the incidental halogenide ion, predominately carbonate ion as the anion. The least alkaline or most acidic limit, on the other hand, is substantially equivalent to that alkalinity which would be produced if the reaction mixture contained predominately bicarbonate ion as the anion, again disregarding the incidental halogenide ion which has no effect on the alkalinity. By alkalinity reference is made to the hydroxyl ion concentration and the most alkaline limit at which it is preferred to allow the reaction mixture to reach is that hydroxyl ion concentration which is inherent with an alkali metal carbonate solution at about the same temperature as the reaction mixture. The least alkaline limit is the hydroxyl ion concentration which is inherent with an alkali metal bicarbonate solution also at about the same temperature as the reaction mixture. More particularly, the reaction mixture is maintained between the alkalinity of a 0.042 normal aqueous solution of sodium carbonate and a 0.018 normal aqueous solution of sodium bicarbonate when these solutions are at the same temperature as the reaction mixture.

By conducting the reaction under conditions of controlled and substantially constant alkalinity within the preferred carbonate-bicarbonate range, the large proportion of ether obtained by methods of the prior art wherein the alkalinity was not controlled when using metal hydroxides is eliminated. When the alkalinity is greater than that within the carbonate-bicarbonate region, both the amount of ether as well as olefines produced become large resulting in a low yield of alcohol. Furthermore, if the reaction is conducted at a less alkaline point than bicarbonate, the reaction becomes slow and the proportion of ether again is large. When the alkalinity is very low such as when there is present in the reaction mixture substantial amounts of hydrohalogenide, extensive damage of the usual metal reaction vessel may result from this very corrosive substance.

The halogenated hydrocarbons which may be hydrolyzed to the corresponding monohydric alcohols in accordance with the process of the invention are characterized by containing in their structure only one hydrolyzable halogen atom, that is, only one halogen atom which is capable of being replaced by a hydroxy group under the conditions of execution of the process. The hydrolyzable halogen atom is linked directly to a carbon atom which is saturated and of aliphatic character, but which may be of primary, secondary or tertiary character. The saturated carbon atom to which the hydrolyzable halogen atom is attached may be part of an open alkyl or alkenyl chain or it may be contained in a cycloaliphatic or cycloalkenyl ring. The hydrolyzable halogen atom may be a chlorine, bromine, iodine or fluorine atom. Representative saturated aliphatic halides which may be hydrolyzed to the corresponding monohydric alcohols are methyl chloride, methyl bromide, ethyl chloride, n-propyl chloride, isopropyl chloride, n-butyl chloride, isobutyl chloride, secondary butyl chloride, tertiary butyl chloride, the amyl chlorides, and the like and their homologues and analogues. Representative cycloaliphatic halides which may be hydrolyzed to the corresponding cycloaliphatic alcohols are cyclopentyl chloride, methyl cyclopentyl chloride, cyclohexyl chloride, methyl cyclohexyl chloride, ethyl cyclohexyl chloride, the cycloheptyl chlorides, and the like. Representative aralkyl halides to which the process is applicable are benzyl chloride, 1-chlor-2-phenyl ethane, 1-chor-3-phenyl propane, 2-chlor-3-phenyl propane and the like and their homologues and suitable substitution products.

A preferred embodiment of the invention comprises conversion of unsaturated organic halides to the corresponding unsaturated monohydric alcohols. The unsaturated halides to which the process of the invention is applicable are characterized by possessing in their structure a single hydrolyzable halogen atom which halogen atom is linked to a saturated carbon atom of aliphatic character. Representative unsaturated halides to which the process is applicable are allyl chloride, allyl bromide, crotylchloride, crotyl bromide, methyl vinyl carbinyl chloride, isobutenyl chloride, ethyl vinyl carbinyl chloride, the isopentenyl chlorides, 4-chloro butene-1, 5-chloro pentene-1, 5-chloro-pentene-2, 4-chloro-pentene-2, 3-chloro-1-phenyl propene-1, 4-chloro-1-phenyl butene-1, 3-chloro-2-phenyl propene-1, cyclopentenyl chloride, cyclopentenyl bromide, methyl cyclopentenyl chloride, ethyl cyclopentenyl chloride, cyclohexenyl chloride, methyl cyclohexenyl chloride, dimethyl cycloexenyl chloride and the like and their homologues, analogues and suitable substituted products. Particularly suitable unsaturated halides are those which are of the allyl type, that is, which posses an olefinic linkage between two carbon atoms of aliphatic character one of which is linked directly to a saturated monohalogenated carbon atom of aliphatic character. Allyl chloride, crotyl chloride, isobutenyl chloride and 3-chlorocyclopentene-1 are representative allyl type halides. The treated organic halides may possess one or a plurality of olefinic linkages and, beside the single hydrolyzable halogen atom, they may contain one or more non-hydrolyzable halogen atoms. For example, the unsaturated halides such as $$CHCl=CH-CH_2Cl, CH_3-CCl=CH-CH_2Cl,$$
$$CHCl=C-CH_2Cl$$
$$\phantom{CHCl=C-}|$$
$$\phantom{CHCl=C-}CH_3$$

and the like which are vinyl as well as allyl type halides may be treated, in which case only the halogen linked to the saturated carbon atom will be hydrolyzed and the product of the hydrolysis will be the corresponding halogenated unsaturated alcohol.

The alkali metal hydroxides are the most suitable hydroxides to use for converting the halogenated hydrocarbons into alcohols, although other basic metal hydroxides including the alkaline earth metal hydroxides may be used if desired. The alkali metal hydroxides such as lithium hydroxide, sodium hydroxide, potassium hydroxide, rubidium hydroxide and cesium hydroxide are particularly suitable because they possess high solubility in the aqueous reaction medium and because they do not form insoluble compounds with any of the salts of a strong base and a weak acid used in conjunction with them. Aqueous solutions of the hydroxide are conveniently used in the process.

The presence of a salt of a strong base and a weak acid in the reaction mixture along with the metal hydroxide greatly aids the control of the alkalinity of the reaction mixture. If the metal hydroxide is used alone without also having present in the reaction mixture the salt, the alkalinity may easily become too great by too rapid introduction of the hydroxide or it may become decreased to too low a value by not sufficiently rapid introduction of the hydroxide. By having present sufficient salt of a strong base and a weak acid with the hydroxide, the alkalinity of the reaction mixture may be easily maintained substantially constant at the point which permits the attainment of a high yield of alcohol. Any salt of a strong base and a weak acid may be used for this purpose such as for example the salts obtained by reacting the strong bases like alkali metal hydroxides, strong amino bases and the like with weak acids such as carbonic acid, phosphoric acid, phosphorous acid, pyrophosphoric acid, boric acid, arsenious acid, arsenic acid, telluric acid, formic acid, acetic acid, propionic acid, butyric acid, maleic acid, succinic acid, glutaric acid, phthalic acid, phenol, alkyl phenols and the like. The salts which are preferred because they are particularly effective for use in the process are the alkali metal arsenites, arsenates, borates, carbonates, phosphates, pyrophosphates, tellurates, phenolate, and cresolates. Since the alkali metal carbonates, particularly sodium carbonate and bicarbonate, are cheap and readily available as well as having inherent favorable characteristics and action in the process, they are especially suited for use therein. These preferred salts are very desirable for employment with alkali metal hydroxides, due to the fact that with such a combination no insoluble precipitate will be formed and the beneficial effect of the salts will be fully realized.

The process of the invention may be executed in a wide vareity of batchwise, intermittent or continuous manners. For example, a suitable batchwise method is to introduce the hydrolyzable halogenated hydrocarbon along with a suitable quantity of water into a reaction vessel equipped with heating means and agitating means such as a stirring device. The metal hydroxide solution together with a salt of a strong base and a weak acid are next introduced at such a rate that the alkalinity of the reaction mixture is maintained substantially within the carbonate-bicarbonate range. The control of the alkalinity may be aided by use of suitable electrodes and auxiliary apparatus so that a measure of the alkalinity of the reaction mixture may be obtained at all times during the course of the reaction. When the reaction is substantially complete, the alcohol may be recovered by any of the usual methods known to the art.

A continuous method of operation such as the following may be more desirable especially for large scale production of the alcohols. A hydrolyzable hydrocarbon halide may be continuously introduced into a reaction vessel, such as a long tubular vessel or a vessel wherein the length is not great as compared to the width, equipped with heating means. Agitation in the reaction vessel may be obtained by withdrawing a portion of the reaction mixture from the reaction vessel and returning it to the vessel at a different point by means of a pump. The metal hydroxide solution is introduced continuously into the reaction mixture simultaneously with the salt of a strong base and a weak acid at such a rate that the alkalinity of the reaction mixture is maintained at the desired point. If desired, the reaction vessel may be equipped with suitable electrodes and other apparatus for regulating the rate of hydroxide introduction and thus controlling the alkalinity. The crude reaction mixture may be withdrawn from the reaction vessel continuously and the alcohol refined in the usual manner. Best results are obtainable with such a system when the rate of circulation is large compared to the rate of introduction of salt and reactants.

The temperature at which the reaction is conducted has a marked effect on the rate of reaction. In general, the higher the temperature, the more rapid is the reaction. When the reaction is allow to proceed at a temperature of from about 75° C. to about 250° C. the reaction is sufficiently rapid to be practicable. A preferred temperature is within the range of from about 140° C. to about 180° C. Higher temperatures necessitate the use of pressures greater than atmospheric on the reaction mixture since the reaction take place in the liquid phase. In general, the pressure on the reaction mixture is at least equal to the total vapor pressure of the reaction mixture at the operating temperature.

Another factor which has an influence on the reaction rate is the concentration of the reactants in the reaction mixture. With other things equal, the more dilute the aqueous reaction mixture the more rapid is the rate. Furthermore, the more dilute the reaction mixture, the lower is the concentration of alcohol therein and consequently the amount of ether produced will be less. The formation of ether is believed to be caused by the reaction between the halogenated hydrocarbon and the alcohol present in the reaction mixture from the desired hydrolysis reaction. By having the reaction mixture dilute, the concentration of alcohol is low and the opportunity for this reaction to occur is thereby lessened. In general, the process is executed with the reaction mixture diluted to the extent that the hydrolysis reaction is reasonably rapid and the formation of ether is kept low, but not so dilute that the recovery of the alcohol from the reaction mixture becomes economically prohibitive.

It is desirable to keep the reaction mixture in a state of vigorous agitation during the course of the reaction. The halogenated hydrocarbons hydrolyzable to monohydric alcohols according to the process of the invention are not very soluble in the aqueous reaction medium used in the process. Furthermore, it is desirable to have all parts of the aqueous reaction medium maintained within the desired range of alkalinity and not have local spots therein which are more acid or more basic. Good agitation removes both of these difficulties. It quickly brings the halogenated hydrocarbon into the liquid aqueous medium where the hydrolysis reaction occurs and it maintains the medium in a state of substantially uniform alkalinity.

The following examples are given for illustrative purposes only.

*Example I*

Allyl chloride and 5% sodium hydroxide in aqueous solution containing sodium carbonate equivalent to about 5% of the total alkali of the solution were pumped into a reactor consisting of about 12 feet of 2½ inch pipe. The reaction mixture was circulated through the pipe by means of a centrifugal pump, withdrawing material from one end of the reactor and returning it to the other. The system was heated by means of steam jackets around the pipe reactor and preheating the caustic solution so that the temperature of the reaction mixture was nearly constant at about 156° C. The pressure on the system was maintained at about 200 pounds per square inch. The system was operated so that the inlet to the reactor was maintained substantially at an alkalinity corresponding to 0.010 normal carbonate and 0.022 normal bicarbonate. The outlet of the reactor was about 0.00 normal carbonate and 0.018 normal bicarbonate. During a period of approximately 12.8 hours about 302 lbs. of allyl chloride was run through the reactor of which approximately 88.3% was converted to allyl alcohol and about 8.8% appeared as diallyl ether.

*Example II*

About 3598 lbs. of allyl chloride and about 3975 gallons of 5% sodium hydroxide solution containing sufficient sodium carbonate to be equivalent to about 5% of the total alkali in the solution were run into a reaction system similar to that described in Example I. The temperature of the reaction mixture was maintained at about 149° C. and the pressure at approximately 200 pounds per square inch. The alkalinity of the material entering the reactor was maintained at an alkalinity corresponding to about 0.0083 normal carbonate and about 0.0132 normal bicarbonate while the exit material from the reactor had an alkalinity corresponding to about 0.00 normal carbonate and 0.0117 normal bicarbonate. The overall yield of allyl alcohol amounted to about 85.9% and the ether to 7.6%.

While we have described our invention in a detailed manner and provided specific examples illustrating suitable modes of executing the same, it is to be understood that modifications may be made and that no limitations other than those imposed by the scope of the appended claims are intended.

We claim as our invention:

1. A continuous process for the production of allyl alcohol which comprises continuously feeding allyl chloride, an aqueous solution of an alkali metal hydroxide, and an aqueous solution of an alkali metal carbonate into a liquid aqueous alkaline reaction mixture heated to a temperature between 75° C. and 250° C. while regulating the rate of addition of the metal hydroxide solution with respect to the alkalinity of the reaction mixture so that the alkalinity of the reaction mixture is maintained between the alkalinity of a 0.042 normal aqueous solution of sodium carbonate and the alkalinity of a 0.018 normal aqueous solution of sodium bicarbonate when these solutions are at the same temperature as the reaction mixture, and continuously withdrawing a portion of the allyl alcohol-containing reaction mixture from the main body thereof.

2. A continuous process for the production of allyl alcohol which comprises continuously feeding an allyl halide, an aqueous solution of an alkali metal hydroxide, and an aqueous solution of an alkali metal carbonate into a liquid aqueous alkaline reaction mixture heated to a temperature between 75° C. and 250° C. while regulating the rate of addition of the metal hydroxide solution with respect to the alkalinity of the reaction mixture so that the alkalinity of the reaction mixture is maintained between the alkalinity of a 0.042 normal aqueous solution of sodium carbonate and the alkalinity of a 0.018 normal aqueous solution of sodium bicarbonate when these solutions are at the same temperature as the reaction mixture, and continuously withdrawing a portion of the allyl alcohol-containing reaction mixture from the main body thereof.

3. A continuous process for the production of allyl alcohol which comprises feeding an allyl halide, an aqueous solution of an alkali metal hydroxide, and an aqueous solution of a salt from the group consisting of alkali metal arsenites, arsenates, borates, carbonates, phosphates, pyrophosphates, tellurates, phenolate and cresolates into a liquid aqueous alkaline reaction mixture heated to a temperature of from 75° C. to 250° C. while regulating the rate of addition of the metal hydroxide solution with respect to the alkalinity of the reaction mixture so that the alkalinity of the reaction mixture is maintained between the alkalinity of a 0.042 normal aqueous solution of sodium carbonate and the alkalinity of a 0.018 normal aqueous solution of sodium bicarbonate when these solutions are at the same temperature as the reaction mixture, and continuously withdrawing a portion of the allyl alcohol-containing reaction mixture from the main body of said reaction mixture.

4. A continuous process for the production of allyl alcohol which comprises continuously feeding an allyl halide, an aqueous solution of an alkali metal hydroxide, and an aqueous solution of an alkali metal salt of a weak acid into a liquid aqueous alkaline reaction mixture heated to a temperature of from 75° C. to 250° C. while regulating the rate of addition of the metal hydroxide solution with respect to the alkalinity of the reaction mixture so that the alkalinity of the reaction mixture is maintained between the alkalinity of a 0.042 normal aqueous solution of sodium carbonate and the alkalinity of a 0.018 normal aqueous solution of sodium bicarbonate when these solutions are at the same temperature as the reaction mixture, and continuously withdrawing a portion of the allyl alcohol-containing reaction mixture from the main body of said reaction mixture.

5. A continuous process for the production of an unsaturated monohydric alcohol which comprises continuously feeding an unsaturated halide which contains a single hydrolyzable halogen atom, a basic metal hydroxide, and a salt of a strong base and a weak acid into a liquid aqueous alkaline reaction mixture heated to a temperature of from 75° C. to 250° C. while regulating the rate of addition of the metal hydroxide with respect to the alkalinity of the reaction mixture so that the alkalinity of the reaction mixture is maintained between the alkalinity of a 0.042 normal aqueous solution of sodium carbonate and the alkalinity of a 0.018 normal aqueous solution of sodium bicarbonate when these solutions are at the same temperature as the reaction mixture, and continuously withdrawing a portion of the allyl alcohol-containing reaction mixture from the main body of said reaction mixture.

6. A continuous process for the production of a monohydric alcohol which comprises continuously feeding a halogenated hydrocarbon containing a single hydrolyzable halogen atom, a basic metal hydroxide, and a salt of a strong base and a weak acid into a heated liquid aqueous alkaline reaction mixture while regulating the rate of addition of the metal hydroxide with respect to the alkalinity of the reaction mixture so that the alkalinity of the reaction mixture is maintained between the alkalinity of a 0.042 normal aqueous solution of sodium carbonate and the alkalinity of a 0.018 normal aqueous solution of sodium bicarbonate when these solutions are at the same temperature as the reaction mixture, and continuously withdrawing a portion of the alcohol-containing reaction mixture from the main body of said reaction mixture.

7. In a process for the production of allyl alcohol by effecting the hydrolysis of an allyl halide in a liquid aqueous alkaline reaction medium containing sodium carbonate at a temperature of from 75° C. to 250° C., the improvement which comprises effecting the hydrolysis by adding sodium hydroxide to said reaction mixture at a rate relative to the alkalinity of the reaction mixture so that the alkalinity of the reaction mixture is maintained between the alkalinity of a 0.042 normal aqueous solution of sodium carbonate and the alkalinity of a 0.018 normal aqueous solution of sodium bicarbonate when these solutions are at the same temperature as the reaction mixture.

8. In a process for the production of cyclopentanol by effecting the hydrolysis of cyclopentyl chloride in a liquid aqueous alkaline reaction mixture containing sodium carbonate heated at a temperature of from 75° C. to 250° C., the improvement which comprises effecting the hydrolysis by adding sodium hydroxide to the reaction mixture at a rate relative to the alkalinity of the reaction mixture so that the alkalinity of the reaction mixture is maintained between the alkalinity of an 0.042 normal aqueous solution of sodium carbonate and the alkalinity of a 0.018 normal aqueous solution of sodium bicarbonate when these solutions are at the same temperature as the reaction mixture.

9. In a process for the production of a cycloaliphatic monohydric alcohol by effecting the hydrolysis of the corresponding cycloaliphatic halide which contains a single hydrolyzable halogen atom in a liquid aqueous alkaline medium containing a salt of a strong base and a weak acid, the improvement which comprises effecting the hydrolysis by adding a basic metal hydroxide to the reaction mixture at a rate with respect to the alkalinity of the reaction mixture so that the alkalinity of the reaction mixture is maintained between the alkalinity of an 0.042 normal aqueous solution of sodium carbonate and the alkalinity of a 0.018 normal aqueous solution of sodium bicarbonate when these solutions are at the operating temperature.

10. In a process for the production of a monohydric alcohol by effecting the hydrolysis of the corresponding halogenated hydrocarbon which contains a single halogen atom linked to a saturated carbon atom in a liquid aqueous alkaline medium containing a salt from the group consisting of alkali metal arsenites, arsenates, borates, carbonates, phosphates, pyrophosphates, tellurates, phenolate and cresolates, the improvement which comprises adding an alkali metal hydroxide to the reaction mixture at a rate with respect to the alkalinity of the reaction mixture so that the alkalinity of the reaction mixture is maintained between the alkalinity of an 0.042 normal aqueous solution of sodium carbonate and the alkalinity of a 0.018 normal aqueous solution of sodium bicarbonate when these solutions are at the same temperature as that of the reaction mixture.

11. In a process for the production of a monohydric alcohol by effecting the hydrolysis of the corresponding halogenated hydrocarbon which contains a single halogen atom linked to a saturated carbon atom in a liquid aqueous alkaline medium containing an alkali metal carbonate, the improvement which comprises adding an alkali metal hydroxide to the reaction mixture at a rate with respect to the alkalinity of the reaction mixture so that the alkalinity of the reaction is maintained between the alkalinity of a 0.042 normal aqueous solution of sodium carbonate and the alkalinity of a 0.018 normal aqueous solution of sodium bicarbonate when these solutions are at the same temperature as that of the reaction mixture.

12. In a process for the production of a monohydric alcohol by effecting the hydrolysis of the corresponding halogenated hydrocarbon which contains a single halogen atom linked to a saturated carbon atom in a liquid aqueous alkaline medium containing a salt of a strong base and a weak acid, the improvement which comprises adding a basic metal hydroxide to the reaction mixture at a rate with respect to the alkalinity of the reaction mixture so that the alkalinity of the reaction mixture is maintained between the alkalinity of an 0.042 normal aqueous solution of sodium carbonate and the alkalinity of a 0.018 normal aqueous solution of sodium bicarbonate when these solutions are at the same temperature as that of the reaction mixture.

13. A process for the production of allyl alcohol which comprises hydrolyzing an allyl halide at a temperature of from 75° C. to 250° C. in a liquid aqueous alkaline reaction mixture containing an alkali metal carbonate with an alkali metal hydroxide, said hydroxide being added to the reaction mixture at a rate relative to the alkalinity of the reaction mixture so that the alkalinity of the reaction mixture is maintained at an alkalinity between that equivalent to the alkalinity of an 0.042 normal aqueous solution of sodium carbonate and that of a 0.018 normal aqueous solution of sodium bicarbonate when these solutions are at the same temperature as the operating hydrolyzing temperature.

14. A process for the production of a monohydric alcohol which comprises hydrolyzing the corresponding halogenated hydrocarbon which contains a single halogen atom linked to a saturated carbon atom in a liquid aqueous alkaline reaction mixture containing a salt from the group consisting of alkali metal arsenites, arsenates, borates, carbonates, phosphates, pyrophosphates, tellurates, phenolate and cresolates with an alkali metal hydroxide, said hydroxide being added to the reaction mixture at a rate relative to the alkalinity of the reaction mixture so that the alkalinity of the reaction mixture is maintained at an alkalinity between that equivalent to the alkalinity of an 0.042 normal aqueous solution of sodium carbonate and that of a 0.018 normal aqueous solution of sodium bicarbonate when these solutions are at the same temperature as the operating hydrolyzing temperature.

15. A process for the production of a monohydric alcohol which comprises hydrolyzing the corresponding halogenated hydrocarbon which contains a single halogen atom linked to a saturated carbon atom in a liquid aqueous alkaline mixture containing a salt of a strong base and a weak acid with a basic metal hydroxide, said hydroxide being added to the reaction mixture at a rate relative to the alkalinity of the reaction mixture so that the alkalinity of the reaction mixture is maintained at an alkalinity between that equivalent to the alkalinity of an 0.042 normal aqueous solution of sodium carbonate and that of a 0.018 normal aqueous solution of sodium bicarbonate when these solutions are at the same temperature as the operating hydrolyzing temperature.

GERALD H. VAN DE GRIENDT.
KENNETH E. MARPLE.
LESLIE M. PETERS.